(12) United States Patent
Suzuki et al.

(10) Patent No.: US 11,608,014 B2
(45) Date of Patent: Mar. 21, 2023

(54) SOUND-ABSORBING MATERIAL

(71) Applicant: IBIDEN CO., LTD., Ogaki (JP)

(72) Inventors: Daisuke Suzuki, Takahama (JP);
Yasutaka Ito, Takahama (JP);
Tomoyoshi Nakamura, Ibi-gun (JP);
Koji Ohshika, Takahama (JP)

(73) Assignee: IBIDEN CO., LTD., Ogaki (JP)

( * ) Notice: Subject to any disclaimer, the term of this patent is extended or adjusted under 35 U.S.C. 154(b) by 242 days.

(21) Appl. No.: 16/575,386

(22) Filed: Sep. 19, 2019

(65) Prior Publication Data

US 2020/0010028 A1    Jan. 9, 2020

Related U.S. Application Data

(63) Continuation of application No. PCT/JP2018/011449, filed on Mar. 22, 2018.

(30) Foreign Application Priority Data

Mar. 24, 2017    (JP) .............................. JP2017-059649

(51) Int. Cl.
| | | |
|---|---|---|
| *B32B 3/24* | (2006.01) | |
| *B60R 13/08* | (2006.01) | |
| *B32B 5/06* | (2006.01) | |
| *B32B 3/26* | (2006.01) | |

(52) U.S. Cl.
CPC ...... *B60R 13/0838* (2013.01); *B60R 13/0876* (2013.01); *B32B 3/266* (2013.01); *B32B 5/06* (2013.01); *B32B 2250/03* (2013.01); *B32B 2262/101* (2013.01); *B32B 2262/108* (2013.01); *B60R 13/0861* (2013.01)

(58) Field of Classification Search
CPC ........................................................ B32B 3/266
USPC .................................. 428/138, 137, 133, 132
See application file for complete search history.

(56) References Cited

U.S. PATENT DOCUMENTS

| | | | |
|---|---|---|---|
| 1,035,190 A * | 8/1912 | Hill ...................... A61F 13/511 | |
| | | | 428/443 |
| 1,959,057 A | 5/1934 | Kliefoth | |
| 4,397,894 A * | 8/1983 | Haines, Jr. .............. B32B 27/12 | |
| | | | 428/138 |
| 5,196,253 A * | 3/1993 | Mueller .................. B32B 3/266 | |
| | | | 181/211 |
| 7,913,813 B1 | 3/2011 | Mathur | |
| 2007/0102237 A1 | 5/2007 | Baig | |

(Continued)

FOREIGN PATENT DOCUMENTS

| | | |
|---|---|---|
| CN | 102282013 | 12/2011 |
| CN | 103733253 | 4/2014 |

(Continued)

*Primary Examiner* — William P Watkins, III
(74) *Attorney, Agent, or Firm* — Mori & Ward, LLP

(57) ABSTRACT

The present invention aims to provide a sound-absorbing material having sound absorption performance with an average sound absorption coefficient of 0.65 or more in the frequency domain of 800 to 2000 Hz. The present invention relates to a sound-absorbing material including: a fiber layer including a plurality of holes open to a surface thereof and having a thickness of 3 mm or more; and an inorganic material layer formed on the surface of the fiber layer, the holes being blind holes each penetrating through the inorganic material layer and having a bottom inside the fiber layer.

20 Claims, 7 Drawing Sheets

(56) References Cited

U.S. PATENT DOCUMENTS

| | | | |
|---|---|---|---|
| 2009/0197044 A1* | 8/2009 | Pelzer | .................. B32B 15/046 |
| | | | 428/138 |
| 2011/0266088 A1 | 11/2011 | Koike et al. | |
| 2013/0118831 A1 | 5/2013 | Kawai et al. | |
| 2014/0138182 A1 | 5/2014 | Kang et al. | |
| 2017/0169809 A1 | 6/2017 | Takata | |

FOREIGN PATENT DOCUMENTS

| | | |
|---|---|---|
| CN | 105981098 | 9/2016 |
| JP | 59-89916 U | 6/1984 |
| JP | 2000-034937 | 2/2000 |
| JP | 2000-034938 | 2/2000 |
| JP | 2000-089767 | 3/2000 |
| JP | 2005-088873 | 4/2005 |
| JP | 2008-096637 | 4/2008 |
| JP | 2009-039989 | 2/2009 |

\* cited by examiner

SOUND-ABSORBING MATERIAL

TECHNICAL FIELD

The present invention relates to a sound-absorbing material.

BACKGROUND ART

Automobiles include power sources such as engines and motors. Operation of these power sources generates various sounds which are transferred to the interior of a vehicle. Sounds transferred to the interior of a vehicle include not only sounds generated by the automobile itself but also sounds such as road noise and wind noise generated outside of the vehicle during driving of the automobiles. In some cases, these sounds are mixed together, producing a sound having a frequency unpleasant to the human ear, i.e., a sound having a frequency of 800 to 2000 Hz.

Thus, soundproofing measures by sound insulation and/or sound absorption are taken in or around an engine, engine room, vehicle body, exhaust pipe, or the like.

As such soundproofing measures, Patent Literature 1 discloses use of a sound absorption device in an automobile, wherein the sound absorption device includes a sound insulation board and a sound absorption unit that includes a stack of metal foil and a highly breathable fiber mat, the metal foil including numerous holes each having an area of 3 mm$^2$ or less and having an opening ratio of 1 to 30%. On the side opposite to the metal foil, a gap is formed between the sound absorption unit and the sound insulation board, and the sound absorption device is disposed on an engine with the metal foil facing the engine.

CITATION LIST

Patent Literature

Patent Literature 1: JP 2000-34938 A

SUMMARY OF INVENTION

Technical Problem

In order to prevent interference of noise with conversation in the vehicle, a sound-absorbing material to be used around the exhaust pipe or engine of an automobile is required to function suitably as a sound-absorbing material in the frequency domain of 500 to 2000 Hz which is the speech range.

In particular, the sound in the frequency domain of 800 to 2000 Hz is unpleasant to the human ear, so that an improvement in sound absorption performance of the sound-absorbing material in this frequency domain is especially expected in order to improve comfortableness in the vehicle.

A sound-absorbing material described in an example of Patent Literature 1 was used to measure sound absorption performance. The results showed insufficient sound absorption performance with an average sound absorption coefficient of less than 0.65 in the low frequency domain of 800 to 2000 Hz.

The present invention was made to solve the above problem, and aims to provide a sound-absorbing material having sound absorption performance with an average sound absorption coefficient of 0.65 or more in the frequency domain of 800 to 2000 Hz.

Solution to Problem

The present invention provides a sound-absorbing material including: a fiber layer including a plurality of holes open to a surface thereof and having a thickness of 3 mm or more; and an inorganic material layer formed on the surface of the fiber layer, the holes being blind holes each penetrating through the inorganic material layer and having a bottom inside the fiber layer.

The sound-absorbing material of the present invention includes a plurality of holes open to the surface of the fiber layer, and the holes are blind holes each penetrating through the inorganic material layer and having a bottom inside the fiber layer.

When the sound-absorbing material receives sound, the sound is incident to the holes open to the surface of the fiber layer. The sound is reflected and attenuated in the holes, and absorbed in the fiber layer, whereby the sound is absorbed by the sound-absorbing material.

In the present invention, the surface of the inorganic fiber layer in which the holes are formed is the side that receives sound.

In the sound-absorbing material of the present invention, the inorganic material layer is formed on the surface of the fiber layer.

As described above, when the sound-absorbing material receives sound, the sound is incident to the holes open to the surface of the fiber layer. The sound is reflected and attenuated in the holes, and absorbed in the fiber layer, whereby the sound is absorbed by the sound-absorbing material. When the sound is reflected in the holes, part of the sound tends to exit to the outside by passing through the fiber layer constituting the side walls of the holes.

When the inorganic material layer is formed on the surface of the fiber layer, the sound that tends to exit to the outside by passing through the fiber layer can be reflected by the inorganic material layer and the sound leakage to the outside thus can be prevented.

As a result, the sound can be efficiently absorbed.

The sound-absorbing material of the present invention is used in or around an engine, engine room, vehicle body, exhaust pipe, and the like. The sound-absorbing material of the present invention, when used in such an environment, is exposed to high temperatures of 400° C. or higher.

When the sound-absorbing material does not include the inorganic material layer, exposure of the sound-absorbing material to high temperatures of 400° C. or higher may cause stretching of the fiber layer and change the shape and size of the holes open to the surface of the fiber layer. Such deformation changes the frequency domain of the sound to be absorbed. As a result, the sound absorption coefficient in the frequency domain of 800 to 2000 Hz may be insufficient.

In contrast, the sound-absorbing material of the present invention includes an inorganic material layer. Owing to the inorganic material layer formed in the sound-absorbing material, the shape and size of the holes formed in the surface of the fiber layer tend to be maintained even when the sound-absorbing material is exposed to high temperatures of 400° C. or higher. Thus, the sound absorption performance is easily maintained.

In the sound-absorbing material of the present invention, the fiber layer has a thickness of 3 mm or more.

A fiber layer having a thickness of less than 3 mm is too thin to absorb the sound, making it difficult to provide sufficient sound absorption performance.

In the sound-absorbing material of the present invention, the fiber layer preferably has a thickness of 3 to 50 mm. The fiber layer having a thickness of more than 50 mm has no problem in the functional performance and sound absorption performance as the sound-absorbing material. However, when the fiber layer has a thickness of more than 50 mm, the sound-absorbing material may be too thick to be placed in or around the engine, engine room, vehicle body, or exhaust pipe.

In the sound-absorbing material of the present invention, the holes in the fiber layer preferably have a depth that is 50 to 90% of the thickness of the fiber layer.

When the holes have a depth that is less than 50% of the thickness of the fiber layer, the depth of the holes to reflect and absorb the sound is insufficient, making it difficult for the sound-absorbing material to absorb the sound and provide sound absorption performance.

When the holes have a depth that is more than 90% of the thickness of the fiber layer, the sound that entered the holes of the sound-absorbing material is not absorbed in the fiber layer and passes therethrough, making it difficult for the sound-absorbing material to provide sound absorption performance.

When the depth of the holes is in the range of 50 to 90%, the depth of the holes to reflect the sound incident in the holes is sufficient enough to absorb the sound. Thus, the sound-absorbing material has sound absorption performance.

In the sound-absorbing material of the present invention, the fiber layer preferably includes a stack of two or more fiber layers.

Use of two or more fiber layers facilitates adjusting the thickness of the sound-absorbing material.

In the sound-absorbing material of the present invention, the fiber layer may include a stack of two fiber layers. In this case, a through-hole is formed in a first fiber layer but not in a second fiber layer, provided that the first fiber layer is closer to the side that receives sound than the second fiber layer is, and these two fiber layers are stacked together, whereby a blind hole having a bottom inside the fiber layer can be produced.

Forming through-holes in the first fiber layer and stacking the first fiber layer with the second fiber layer without holes to form blind holes each having a bottom inside the fiber layer is easier than forming blind holes having bottoms inside the fiber layer using only one fiber layer.

In the sound-absorbing material of the present invention, the fiber layer preferably contains inorganic fibers.

Inorganic fibers have high heat resistance and are less likely to be deformed by temperature changes. Thus, the fiber layer containing the inorganic fibers can absorb the sound also in the spaces formed by the fibers, easily providing sound absorption performance.

In the sound-absorbing material of the present invention, the inorganic fibers preferably consist of at least one inorganic fibers selected from the group consisting of alumina fibers, alumina-silica fibers, silica fibers, glass wool, and rock wool.

These inorganic fibers have high heat resistance and are less likely to be deformed by temperature changes, unlike the case where a non-woven fabric formed of organic fibers is used. Thus, the inorganic fibers are suitably used to form the fiber layer.

In the sound-absorbing material of the present invention, the area per opening of the hole is preferably 0.10 to 15 mm$^2$.

When the area per opening of the hole is less than 0.10 mm$^2$, the sound does not easily enter the hole, and the sound is not easily reflected or absorbed in the hole, making it difficult to provide sound absorption performance.

When the area per opening of the hole is more than 15 mm$^2$, the target sound having a specific frequency is not easily reflected or absorbed in the holes. This makes it difficult to provide sound absorption performance.

When the area per opening of the hole is in the range of 0.10 to 15 mm$^2$, the sound is easily reflected and absorbed in the holes, making it easy to provide sound absorption performance. It also makes it easy to provide sound absorption performance in the frequency domain of 2000 Hz or less.

In the sound-absorbing material of the present invention, the inorganic material layer preferably contains at least one inorganic material selected from the group consisting of a calcium-based material, a silica-based material, an alumina-based material, a carbon-based material, and a titanium-based material.

When the inorganic material layer containing these inorganic materials is formed on the surface of the fiber layer, the sound that tends to exit to the outside by passing through the fiber layer constituting the side walls of the holes can be reflected by the inorganic material layer and the sound leakage to the outside thus can be prevented.

As a result, the sound can be efficiently absorbed. Additionally, even when stress is applied to the sound-absorbing material, deformation is inhibited, maintaining the shape and size of the holes open to the surface of the fiber layer. Therefore, the shape retainability of the sound-absorbing material is maintained, and the sound absorption performance is thus maintained.

In the sound-absorbing material of the present invention, the inorganic material layer preferably has a thickness of 0.1 to 5 mm.

An inorganic material layer having a thickness of less than 0.1 mm does not much contribute to the sound reflection effect.

An inorganic material layer having a thickness of more than 5 mm may not have flexibility and be cracked when the sound-absorbing material is placed at a predetermined position, failing to maintain the shape of the openings.

The sound-absorbing material of the present invention preferably has an average sound absorption coefficient of 0.65 or more in the frequency domain of 800 to 2000 Hz.

The sound in the frequency domain of 800 to 2000 Hz is unpleasant to the human ear. When the average sound absorption coefficient in this frequency domain is 0.65 or more, it can reduce unpleasantness to people. Thus, such a sound-absorbing material is considered to have sufficient sound absorption performance.

In the present invention, the term "sound absorption coefficient" means the sound absorption coefficient measured in accordance with JIS A 1405-2:2007 "Acoustics—Determination of sound absorption coefficient and impedance in impedance tubes—Part 2: Transfer-function method".

The sound-absorbing material of the present invention is preferably used for any one of the engine, engine room, vehicle body, or exhaust pipe.

The sound-absorbing material of the present invention maintains shape retainability even when the temperature changes, and has sound absorption performance with an average sound absorption coefficient of 0.65 or more in the frequency domain of 800 to 2000 Hz. Thus, the sound-absorbing material can be suitably used for the above use.

DESCRIPTION OF EMBODIMENTS

Figure 1A:
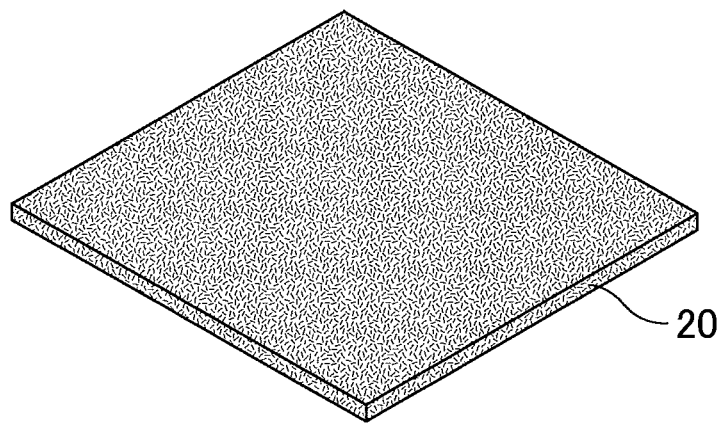
FIG. 1A, FIG. 1B and FIG. 1C show a schematic process diagram of an exemplary method of producing a sound-absorbing material of the present invention.

The sound-absorbing material of the present invention is described in detail below.

The present invention provides a sound-absorbing material including: a fiber layer including a plurality of holes open to a surface thereof and having a thickness of 3 mm or more; and an inorganic material layer formed on the surface of the fiber layer, the holes being blind holes each penetrating through the inorganic material layer and having a bottom inside the fiber layer.

The sound-absorbing material of the present invention includes a plurality of holes open to the surface of the fiber layer, and the holes are blind holes each penetrating through the inorganic material layer and having a bottom inside the fiber layer.

When the sound-absorbing material receives sound, the sound is incident to the holes open to the surface of the fiber layer. The sound is reflected and attenuated in the holes, and absorbed in the fiber layer, whereby the sound is absorbed by the sound-absorbing material.

In the present invention, the surface of the inorganic fiber layer in which the holes are formed is the side that receives sound.

In the sound-absorbing material of the present invention, the holes are blind holes.

If the sound-absorbing material included through-holes penetrating through the fiber layer, sound received by the sound-absorbing material would pass through the through-holes. Thus, the sound would be transferred to the back side of the fiber layer of the sound-absorbing material, and the sound-absorbing material would not function as a sound-absorbing material.

In contrast, in the sound-absorbing material of the present invention, the holes have bottoms inside the fiber layer. Thus, the sound that entered the holes will be reflected and attenuated. As the sound enters the fiber layer, the sound is absorbed in the fibers. As a result, the sound is less likely to be transferred to the back side of the sound-absorbing material, and the sound-absorbing material can provide sound absorption performance.

Further, the sound-absorbing material of the present invention has an average sound absorption coefficient of 0.65 or more in the frequency domain of 800 to 2000 Hz, and can provide sound absorption performance in the frequency domain of 2000 Hz or less.

In the sound-absorbing material of the present invention, the fiber layer has a thickness of 3 mm or more, preferably 3 to 50 mm.

A fiber layer having a thickness of less than 3 mm is too thin to absorb sound, making it difficult to provide sufficient sound absorption performance.

The fiber layer having a thickness of more than 50 mm has no problem in the functional performance and sound absorption performance as the sound-absorbing material, however, the fiber layer may be too thick to be placed when used as an automotive sound-absorbing material in or around the engine, engine room, vehicle interior, vehicle body, or exhaust pipe.

In the sound-absorbing material of the present invention, the fiber layer may include a stack of two or more fiber layers.

Use of two or more fiber layers facilitates adjusting the thickness of the sound-absorbing material. The two or more fiber layers may be adhered to each other by an adhesive such as an inorganic adhesive or an organic adhesive. The number of fiber layers is not limited, but two layers are preferred.

The material constituting each of the two or more fiber layers may be the same as or different from each other.

The thickness of each of the two or more fiber layers may be the same as or different from each other. The bulk density of each of, the two or more fiber layers may be the same as or different from each other.

In the sound-absorbing material of the present invention, the fiber layer may include a stack of two fiber layers. In this case, a through-hole is formed in a first fiber layer but not in a second fiber layer, provided that the first fiber layer is closer to the side that receives sound than the second fiber layer is, and these two fiber layers are stacked together, whereby a blind hole having a bottom inside the fiber layer can be produced.

Forming through-holes in the first fiber layer and stacking the first fiber layer with the second fiber layer without holes to form blind holes each having a bottom inside the fiber layer is easier than forming blind holes having bottoms inside the fiber layer using only one fiber layer.

In the sound-absorbing material of the present invention, the fiber layer preferably contains inorganic fibers.

Inorganic fibers have high heat resistance and are less likely to be deformed by temperature changes. Thus, the fiber layer containing the inorganic fibers can absorb the sound also in the spaces formed by the fibers, easily providing sound absorption performance.

In the sound-absorbing material of the present invention, the inorganic fibers preferably consist of at least one inorganic fibers selected from the group consisting of alumina fibers, alumina-silica fibers, silica fibers, glass wool, and rock wool.

These inorganic fibers have high heat resistance and are less likely to be deformed, unlike the case where a nonwoven fabric formed of organic fibers is used. Thus, the inorganic fibers are suitably used to form the fiber layer.

The inorganic fibers for use in the sound-absorbing material of the present invention are preferably alumina-silica fibers.

When the inorganic fibers are alumina-silica fibers, the ratio of components of alumina to silica by weight ratio is preferably alumina ($Al_2O_3$):silica ($SiO2$)=60:40 to 80:20, more preferably alumina ($Al_2O_3$):silica ($SiO_2$)=70:30 to 74:26.

The fibers forming the fiber layer preferably have an average fiber length of 0.1 to 150 mm, more preferably 1 to 20 mm, still more preferably 2 to 15 mm.

Fibers having an average fiber length of less than 0.1 mm are too short, resulting in insufficient entangling of the fibers with each other in the fiber layer, and failing to provide sufficient strength to the fiber layer. Thus, the fiber layer has poor shape retainability, and cannot function as the sound-absorbing material.

Fibers having an average fiber length of more than 150 mm are too long, making it difficult to produce a fiber layer. Further, the resulting fiber layer has a low density and poor shear strength, so that the fiber layer, when used as a sound-absorbing material, is susceptible to defects such as cracks, and cannot function as the sound-absorbing material.

The fiber layer constituting the sound-absorbing material can be produced by various methods. For example, a needling method or papermaking method can be used.

The fiber layer obtained by the needling method has an entangled structure. In order to obtain this structure, the fibers need to have a certain average fiber length. Thus, the fibers to be used in the needling method preferably have an average fiber length of 1 to 150 mm, more preferably 10 to 80 mm.

Inorganic fibers having an average fiber length of less than 1 mm are too short, resulting in sufficient entangling of the fibers with each other and failing to provide sufficient strength to the fiber layer. Thus, the fiber layer has poor shape retainability, and cannot function as the sound-absorbing material. Further, when such a sound-absorbing material is wound around an exhaust gas treating body, it is poorly wound and is thus easily breakable.

Fibers having an average fiber length of more than 150 mm are too long, resulting in a reduced number of fibers constituting the sound-absorbing material. The resulting fiber layer has a low density, so that the fiber layer, when used as a sound-absorbing material, is susceptible to defects such as cracks.

The average fiber length of the fibers constituting the fiber layer obtained by the papermaking method is preferably 0.1 to 20 mm.

Fibers having an average fiber length of less than 0.1 mm are too short, resulting in poor shape retainability of the fiber layer. Further, such fibers will not be suitably entangled with each other when assembled together as the fiber layer, failing to provide a sufficient contact pressure.

Fibers having an average fiber length of more than 20 mm are too long and thus too strongly entangled with each other in a slurry solution obtained by dispersing the fibers in water in a papermaking step. Such fibers tend to unevenly accumulate when assembled together as the fiber layer, and the resulting fiber layer has poor shear strength. Thus, the fiber layer, when used as a sound-absorbing material, is susceptible to defects such as cracks.

For the measurement of the fiber length, fibers are pulled out using tweezers from the fiber layer produced by the needling method or papermaking method without breaking the fibers, and the fiber length is measured using an optical microscope.

As used herein, the average fiber length is the average length determined by measuring the fiber length of 300 fibers pulled out from the fiber layer. When the fibers cannot be pulled out from the fiber layer without breaking the fibers, the fiber layer may be degreased and introduced into water, so that fibers can be collected without breaking the fibers by separating the fibers from each other.

The fibers forming the fiber layer preferably have an average fiber diameter of 1 to 20 μm, more preferably 2 to 15 μm, still more preferably 3 to 10 μm.

Fibers having an average fiber diameter of less than 1 μm have low strength and are easily broken due to impact or the like. Thus, the fiber layer tends to have low strength and cannot function as the sound-absorbing material.

Fibers having an average fiber diameter of more than 20 μm are too large, resulting in a high young modulus of the fibers and a low flexibility of the fiber layer. Thus, the fiber layer cannot function as the sound-absorbing material.

The fiber layer of the present invention may contain fibers such as glass fibers and biosoluble fibers, in addition to the inorganic fibers.

In the sound-absorbing material of the present invention, the holes in the fiber layer preferably have a depth that is 50 to 90%, more preferably 50 to 75%, of the thickness of the fiber layer.

When the holes have a depth that is less than 50% of the thickness of the fiber layer, the depth of the holes to reflect and absorb the sound is insufficient, making it difficult for the sound-absorbing material to absorb the sound and provide sound absorption performance.

When the holes have a depth that is more than 90% of the thickness of the fiber layer, the sound that entered the holes of the sound-absorbing material is not absorbed in the fiber layer but passes therethrough, making it difficult for the sound-absorbing material to provide sound absorption performance.

When the depth of the holes is in the range of 50 to 90%, the depth of the holes to reflect the sound incident in the holes is sufficient enough to absorb the sound. Thus, the sound-absorbing material has sound absorption performance. Because of these reasons, the sound-absorbing material of the present invention can provide sound absorption performance.

The following describes the opening of each of the holes open to the, surface of the fiber layer of the sound-absorbing material of the present invention.

In regard to the opening of the hole in the sound absorbing material of the present invention, it is important that the opening area does not change by external force. The shape is not limited, and it may be circular, elliptical, triangular, quadrangular, hexagonal, octagonal, or the like. In particular, the shape of the opening is preferably circular or elliptical because these shapes do not have corners, and thus stress concentration at the corners does not occur.

In the sound-absorbing material of the present invention, the openings of the holes may all have the same shape or different shapes.

In the sound-absorbing material of the present invention, the openings of the holes may be arranged in a square pattern in which squares are continuously arranged in longitudinal and transverse directions and the openings are arranged at the corners of the squares in a plan view. Alternatively, the openings may be arranged in a zigzag pattern in which equilateral triangles are continuously arranged in longitudinal and transverse directions and the openings are arranged at the corners of the triangles in a plan view. Of these, the zigzag pattern is preferred. When the openings of the holes are arranged in the zigzag pattern, adjacent holes tend to have the same interval, and the sound attenuation efficiency tends to be high.

In the sound-absorbing material of the present invention, the area per opening of the hole is preferably 0.10 to 15 mm$^2$, more preferably 1.0 to 15 mm$^2$.

When the area per opening of the hole is less than 0.10 mm$^2$, the, sound does not easily enter the hole, and the sound is not easily reflected or absorbed in the hole, making it difficult to provide sound absorption performance.

When the area per opening of the hole is more than 15 mm$^2$, the target sound having a specific frequency is not easily reflected or absorbed in the blind holes. This makes it difficult to provide sound absorption performance. It is further difficult to provide sound absorption performance in the frequency domain of 2000 Hz or less.

In contrast, when the area per opening of the hole is in the range of 0.10 to 15 mm$^2$, the sound is easily reflected and absorbed in the blind holes, making it easy to provide sound absorption performance. It also makes it easy to provide sound absorption performance in the frequency domain of 2000 Hz or less.

In the sound-absorbing material of the present invention, when the opening of the hole has a circular shape, the opening of the hole preferably has a diameter of 0.5 to 4 mm, more preferably 1 to 3 mm.

In the sound-absorbing material of the present invention, an inorganic material layer is formed on the surface of the fiber layer.

When the inorganic material layer is formed on the surface of the fiber layer, the following effect can be achieved in relation to the holes open to the surface of the fiber layer.

As described above, when the sound-absorbing material receives sound, the sound is incident to the holes open to the surface of the fiber layer. The sound is reflected and attenuated in the holes, and absorbed in the fiber layer, whereby the sound is absorbed by the sound-absorbing material. When the sound is reflected in the holes, part of the sound tends to exit to the outside by passing through the fiber layer.

When the inorganic material layer is formed on the surface of the fiber layer, the sound that tends to exit to the outside by passing through the fiber layer constituting the side walls of the holes can be reflected by the inorganic material layer and the sound leakage to the outside thus can be prevented.

As a result, the sound can be efficiently absorbed.

The sound-absorbing material of the present invention is used in or around the engine, engine room, vehicle body, exhaust pipe, or the like. The sound-absorbing material of the present invention, when used in such an environment, is exposed to high temperatures of 400° C. or higher.

When the sound-absorbing material does not include the inorganic material layer, exposure of the sound-absorbing material to high temperatures of 400° C. or higher may cause stretching of the fiber layer and change the shape and size of the holes open to the surface of the fiber layer. Such deformation changes the frequency domain of the sound to be absorbed. As a result, the sound absorption coefficient in the frequency domain of 800 to 2000 Hz may be insufficient.

In contrast, the sound-absorbing material of the present invention includes an inorganic material layer. Owing to the inorganic material layer formed in the sound-absorbing material, the shape and size of the holes formed in the surface of the fiber layer tend to be maintained even when the sound-absorbing material is exposed to high temperatures of 400° C. or higher. Thus, the sound absorption performance is easily maintained.

In the sound-absorbing material of the present invention, the inorganic material layer preferably has a thickness of 0.1 to 5 mm, more preferably 0.5 to 2 mm.

An inorganic material layer having a thickness of less than 0.1 mm does not much contribute to the sound reflection effect.

An inorganic material layer having a thickness of more than 5 mm may not have flexibility and be cracked when the sound-absorbing material is placed at a predetermined position, failing to maintain the shape of the openings.

When the inorganic material layer has a thickness of 0.1 to 5 mm, the inorganic material layer can easily contribute to an effect of inhibiting stretching of the sound-absorbing material. Since stretching of the sound-absorbing material is inhibited, the opening is less likely to be deformed. Therefore, the shape retainability of the sound-absorbing material is maintained, and the sound absorption performance is thus maintained.

In the sound-absorbing material of the present invention, the inorganic material layer preferably contains at least one inorganic material selected from the group consisting of a calcium-based material, a silica-based material, an alumina-based material, a carbon-based material, and a titanium-based material. The inorganic material layer may contain one of these inorganic materials or two or more of these inorganic materials.

Owing to the inorganic material layer containing these inorganic materials formed in the surface of the fiber layer, even when stress is applied to the sound-absorbing material, deformation is inhibited, maintaining the shape and size of the holes open to the surface of the fiber layer. Therefore, the shape retainability of the sound-absorbing material is maintained, and the sound absorption performance is thus maintained.

Specific examples of such an inorganic material include inorganic materials containing one or more of calcium oxide, aluminum oxide, and silicon oxide, and mixture materials containing two or more of aluminum oxide, titanium oxide, and silicon oxide.

In the sound-absorbing material of the present invention, the inorganic material layer preferably has a density of 2 to 6 (g/cm$^3$).

The density of the inorganic material layer is preferably three or more times the density of the fiber layer. It is more preferably 3 to 30 times the density of the fiber layer.

The sound-absorbing material of the present invention preferably has an average sound absorption coefficient of 0.65 or more in the frequency domain of 800 to 2000 Hz.

The sound in the frequency domain of 800 to 2000 Hz is unpleasant to the human ear. When the average sound absorption coefficient in this frequency domain is 0.65 or more, it can reduce unpleasantness to people. Thus, such a sound-absorbing material is considered to have sufficient sound absorption performance.

The sound-absorbing material of the present invention may have any shape as long as it has a shape that fits in a place where the sound-absorbing material is disposed.

Use of the sound-absorbing material of the present invention is not limited. Yet, the sound-absorbing material is preferably used for automobiles. Specifically, use of the sound-absorbing material for any one of the engine, engine room, vehicle interior, vehicle body, or exhaust pipe is preferred.

The sound-absorbing material of the present invention is less likely to be deformed even when exposed to high temperatures of 400° C. or higher, and can maintain its sound absorption performance. Further, the sound-absorbing material can provide sound absorption performance in the frequency domain of 800 to 2000 Hz. Thus, the sound-absorbing material is suitable for automobile use.

The sound-absorbing material may be disposed on a curved surface when used for any one of the engine room, vehicle interior, vehicle body, or exhaust pipe. In such a case, the sound-absorbing material needs to be curved. In this case, stress is generated in the sound-absorbing material, and the inorganic material layer is susceptible to breaking and cracking. Thus, a sound-absorbing material having a shape that fits the shape of the curve may be provided in advance, and disposed on the curved surface. Alternatively, many small sound-absorbing materials may be prepared and disposed on the curved surface to alleviate the stress generated in each sound-absorbing material, whereby breaking and cracking in the inorganic material layer can be prevented.

Next, an exemplary method of producing the sound-absorbing material of the present invention is described.

The method of producing the sound-absorbing material of the present invention described below includes (1) a fiber layer producing step, (2) a hole forming step, and (3) an inorganic material layer forming step.

Figure 1B:
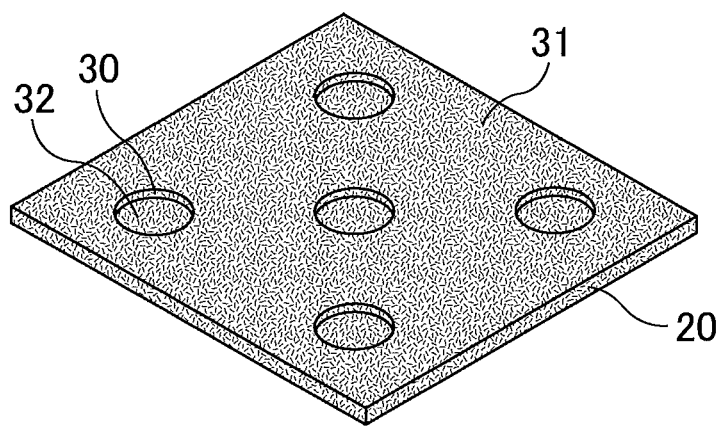
Figure 1C:
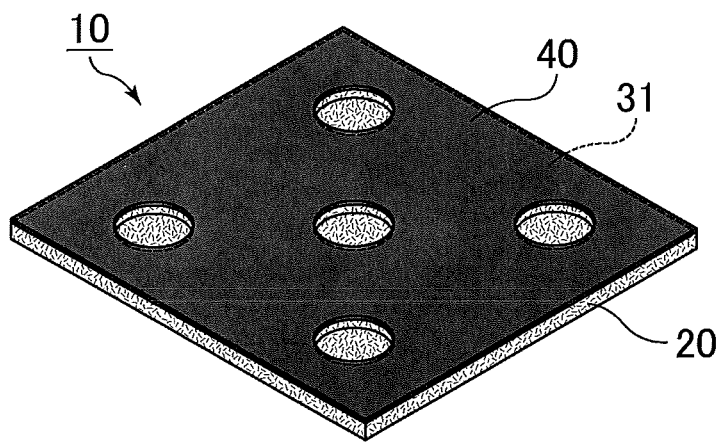

FIG. 1A, FIG. 1B and FIG. 1C show a schematic process diagram of an exemplary method of producing a sound-absorbing material of the present invention.

(1) Fiber Layer Producing Step

As shown in FIG. 1A, in this step, a fiber layer 20 having a thickness of 3 mm or more is prepared. The fiber layer 20 may be prepared by any method. The following describes a method of preparing the fiber layer 20 by a papermaking method which is an exemplary preparation method. The papermaking method described below includes a mixture preparing step, a dehydrating step, and a thermally compressing step.

(Mixture Preparing Step)

Fibers, an inorganic binder, and water are mixed and stirred in a stirrer, whereby a mixture is prepared. Here, inorganic particles and an organic binder may also be mixed, if necessary. Details such as preferred type of the fibers to be used in this step have been already described, so that a description thereof is omitted here.

(Dehydrating Step)

The mixture obtained in the mixture preparing step is poured into a mold having a filtration mesh formed on its bottom. Then, the water in the mixture is removed through the mesh, whereby a raw material sheet is produced.

(Thermally Compressing Step)

The raw material sheet is thermally compressed, whereby a fiber layer is produced. When thermally compressing, the raw material sheet may be heat-treated to dry the raw material sheet by allowing hot air to pass through the raw material sheet, or the raw material sheet may not be heat-treated and may be in a wet state.

The fiber layer can be prepared through the above steps.

(2) Hole Forming Step

As shown in FIG. 1B, in this step, holes 30 are formed in the fiber layer 20 produced in the fiber layer producing step (1) such that each hole 30 has a bottom 32 inside the fiber layer 20. Thereby, each hole 30 becomes a blind hole having the bottom 32 inside the fiber layer 20.

The holes 30 are formed such that each hole 30 has a depth that is 50 to 90% of the thickness of the fiber layer 20.

The method of forming the holes 30 is not limited. Examples include a method in which a portion of the fiber layer 20 is cut out using, for example, a cutter, laser, or drill, without penetrating through the fiber layer 20.

(3) Inorganic Material Layer Forming Step

As shown in FIG. 1C, in this step, in the fiber layer 20 in which the holes 30 are formed in the hole forming step (2), an inorganic material layer 40 is formed on a surface 31 of the fiber layer excluding portions where the holes 30 are formed. The method of forming the inorganic material layer 40 is not limited. Examples include coating and printing.

The following describes a method of forming the inorganic material layer 40 on the fiber layer 20 by coating.

(Inorganic Material Preparing Step)

In this step, a powdered inorganic material is prepared. Details such as preferred type of the inorganic material have been already described, so that a description thereof is omitted here.

(Inorganic Material Adding Step)

In this step, first, a powdered inorganic material is applied to the surface 31 of the fiber layer excluding portions where the holes 30 are formed.

Then, water is added to the inorganic material to slurry the inorganic material applied to the surface 31 of the fiber layer excluding portions where the holes 30 are formed.

When a powdered inorganic material is applied to the surface 31 of the fiber layer excluding portions where the holes 30 are formed and then the inorganic material is slurried as described above, the inorganic material layer 40 to be formed will be firmly fixed to the fiber layer 20.

(Drying Step)

In this step, the slurry inorganic material applied to the surface 31 of the fiber layer excluding portions where the holes 30 are formed is dried, whereby the inorganic material layer 40 is obtained.

The drying conditions are not limited, but preferably, the slurry inorganic material is dried at 70° C. to 100° C. for 5 to 15 minutes.

A sound-absorbing material 10 can be produced through the above steps.

In the inorganic material layer forming step, first, a powdered inorganic material was applied to the surface 31 of the fiber layer excluding portions where the holes 30 are formed, and then water was added to the inorganic material to slurry the inorganic material. Yet, in the method of producing the sound-absorbing material of the present invention, a slurry inorganic material may be directly applied to the surface 31 of the fiber layer excluding portions where the holes 30 are formed.

Next, another exemplary method of producing the sound-absorbing material of the present invention is described. Specifically, it is a method of producing a sound-absorbing material by stacking two fiber layers.

The method of producing the sound-absorbing material of the present invention described below includes (1) a fiber layer producing step, (2) a hole forming step, (3) an inorganic material layer forming step, and (4) a fiber layer producing step.

FIG. 2A, FIG. 2B, FIG. 2C, FIG. 2D and FIG. 2E show a schematic process diagram of an exemplary method of producing the sound-absorbing material of the present invention.

(1) Fiber Layer Producing Step

Figure 2A:
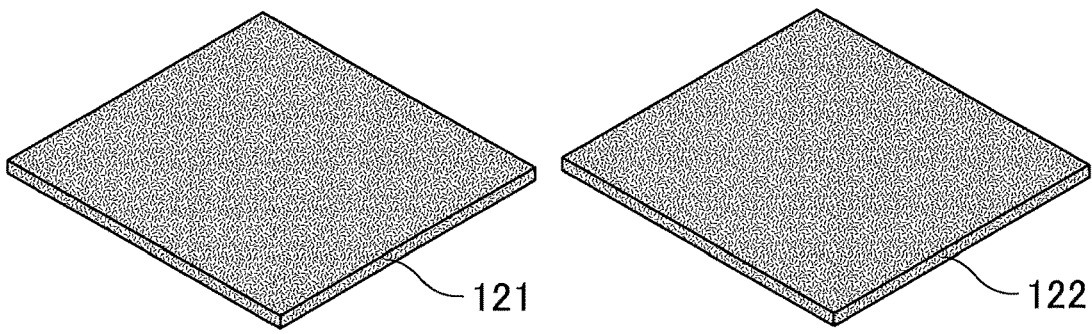
FIG. 2A, FIG. 2B, FIG. 2C, FIG. 2D and FIG. 2E show a schematic process diagram of an exemplary method of producing the sound-absorbing material of the present invention.

As shown in FIG. 2A, in this step, a first fiber layer 121 and a second fiber layer 122 are prepared. The method of preparing each of these fiber layers is not limited. Yet, for example, these fiber layers can be produced by the same method as that of producing the fiber layer in the fiber layer producing step (1) of the method of producing the sound-absorbing material 10.

(2) Hole Forming Step

Figure 2B:
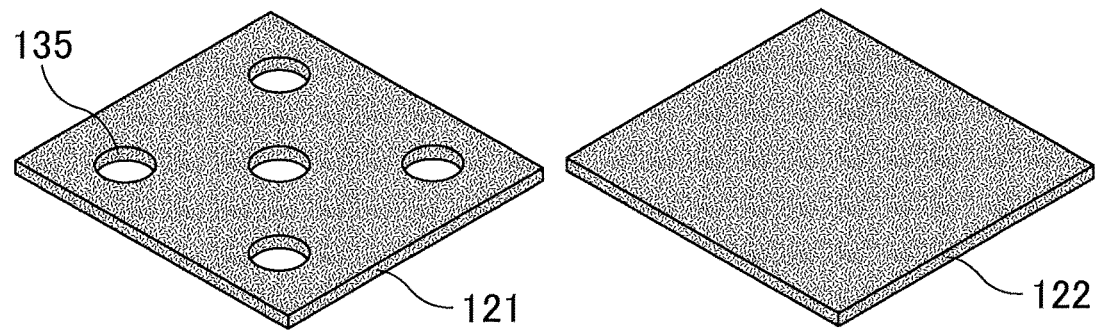

As shown in FIG. 2B, in this step, through-holes 135 are formed to penetrate through the first fiber layer 121.

The method of forming the through-holes 135 in the first fiber layer 121 is not limited. For example, the first fiber layer 121 may be cut out using a cutter to make the through-holes 135, or the first fiber layer 121 may be punched out using a punching machine, laser, or drill to form the through-holes 135. Of these, the method that uses a punching machine is preferred. With the method that uses a punching machine, the through-holes 135 can be easily, quickly, and continuously formed, so that it is economical.

(3) Inorganic Material Layer Forming Step

Figure 2C:
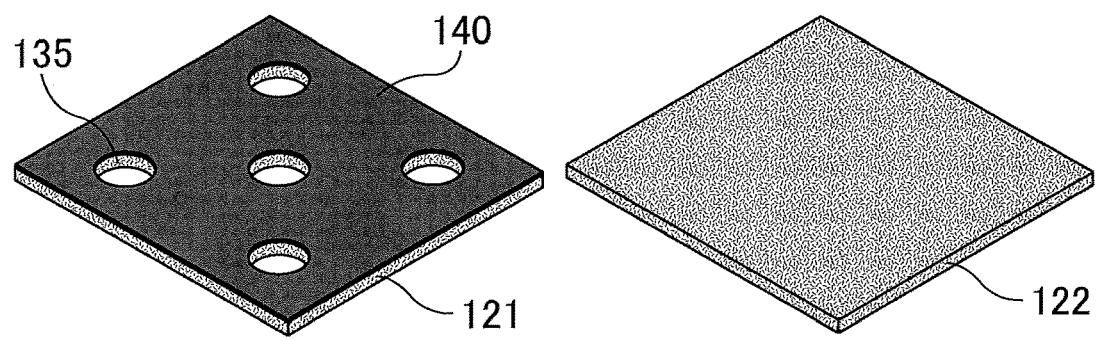

As shown in FIG. 2C, in this step, an inorganic material layer 140 is formed on one of the main surfaces of the first fiber layer 121 in which the through-holes 135 are formed in the hole forming step (2).

The method of forming the inorganic material layer 140 is not limited. Yet, the inorganic material layer 140 can be produced by the same method as that of producing the inorganic material layer 40 in the inorganic material layer forming step (3) of the method of producing the sound-absorbing material 10.

(4) Fiber Layer Producing Step

Figure 2D:
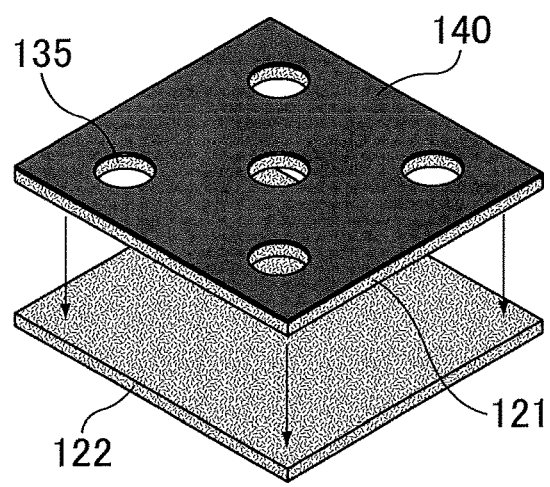

As shown in FIG. 2D, in this step, the first fiber layer 121 in which the inorganic material layer is formed is stacked with the second fiber layer 122, whereby a fiber layer 120 is produced.

Figure 2E:
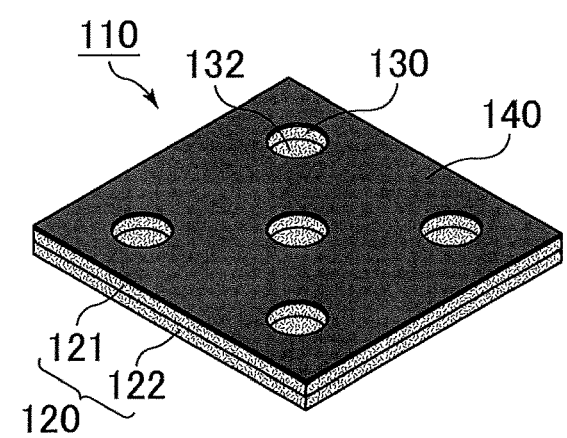

When stacking the first fiber layer 121 with the second fiber layer 122, the back side of the first fiber layer 121 where the inorganic material layer 140 is not formed is pasted to a surface of the second fiber layer using an adhesive, whereby the fiber layer 120 as shown in FIG. 2E is obtained.

The adhesive may be an inorganic binder, organic binder, or the like.

Caution is needed to prevent the adhesive from being attached to positions of the surface of the second fiber layer 122 on the side that comes into contact with the first fiber layer 121, the positions corresponding to the through-holes 135 formed in the first fiber layer 121. It is because the adhesive, when attached to positions corresponding to the through-holes 135 formed in the first fiber layer 121, may interfere with sound absorption.

The through-holes 135 formed in the first fiber layer 121 become holes 130 having the bottoms 132 inside the fiber layer 120 consisting of a stack of layers.

A sound-absorbing material 110 as shown in FIG. 2E can be produced through the above steps.

The sound-absorbing material 110 may also be produced by stacking the first fiber layer 121 in which the through-holes 135 are formed with the second fiber layer 122, and then forming the inorganic fiber layer 140.

The following describes arrangement pattern of the holes to be formed in the sound-absorbing material of the present invention.

Figure 3A:
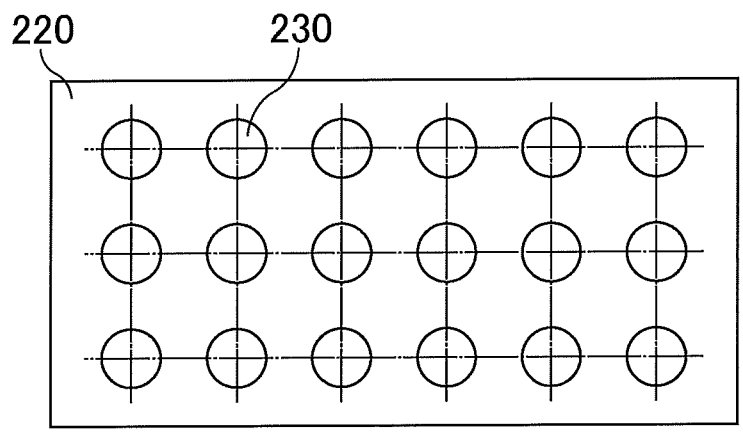
FIG. 3A and FIG. 3B each show a schematic view of arrangement pattern of holes to be formed in the method of producing the sound-absorbing material of the present invention.
Figure 3B:
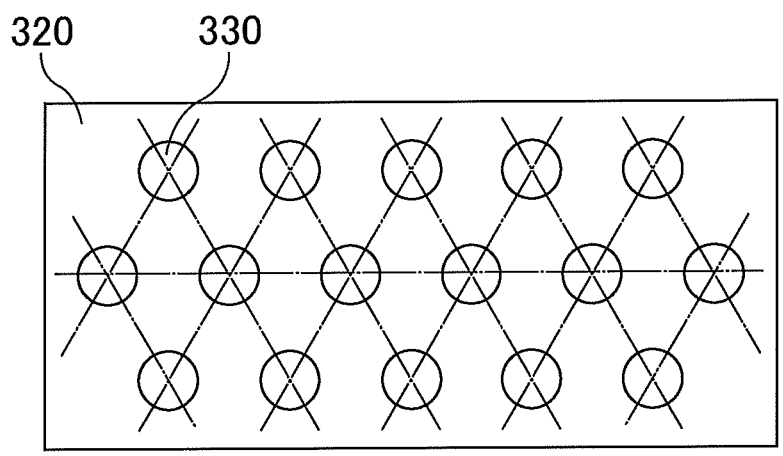

FIG. 3A and FIG. 3B each shows a schematic view of arrangement pattern of the holes to be formed in the method of producing the sound-absorbing material of the present invention.

As shown in FIG. 3A, holes 230 may be formed in a fiber layer 220 such that the holes 230 are positioned at the corners of squares continuously arranged in longitudinal and transverse directions in a plan view.

Alternatively, as shown in FIG. 3B, holes 330 may be formed in a fiber layer 320 such that the holes 330 are positioned at the corners of equilateral triangles continuously arranged in longitudinal and transverse directions in a plan view.

The following describes the cross-sectional shape of the sound-absorbing material of the present invention in parallel to the depth direction of the holes, with reference to the drawing.

Figure 4:
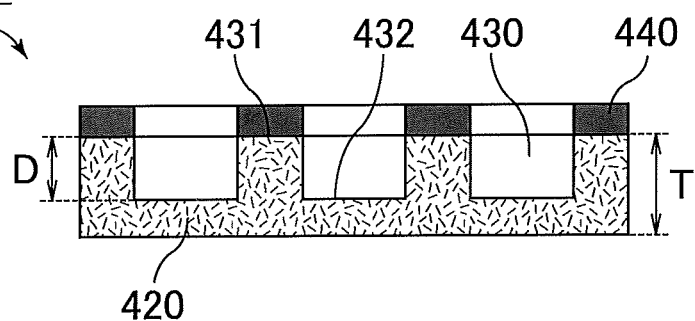
FIG. 4 shows a schematic cross-sectional view of an exemplary cross-sectional shape of the sound-absorbing material of the present invention in parallel to the depth direction of the holes.

FIG. 4 shows a schematic cross-sectional view of an exemplary cross-sectional shape of the sound-absorbing material of the present invention in parallel to the depth direction of the holes.

As shown in FIG. 4, a sound-absorbing material 410 is a sound-absorbing material including a fiber layer 420 including a plurality of holes 430 open to a surface thereof, the fiber layer 420 having a thickness T of 3 mm or more, the sound-absorbing material 410 including an inorganic material layer 440 formed on a surface 431 of the fiber layer 420, the holes 430 in the sound-absorbing material 410 being blind holes each penetrating through the inorganic material layer 440 and having a bottom 432 inside the fiber layer 420. The holes 430 in the fiber layer 420 preferably have a depth D that is 50 to 90% of the thickness T of the fiber layer 420.

EXAMPLES

Examples that more specifically disclose the present invention are described below, but the present invention is not limited to these examples.

Example 1

(1) Fiber Layer Producing Step (Production of Inorganic Fiber Layer)

An inorganic fiber layer was produced by the needling method.

An aqueous solution of basic aluminum chloride having an Al content of 70 g/L at a ratio of Al:Cl=1:1.8 (atomic ratio) was prepared. A silica sol was added to the solution in such a manner that the ratio of components alumina ($Al_2O_3$) to silica ($SiO_2$) was 72:28 (weight ratio) in inorganic fibers after firing, followed by addition of an appropriate amount of an organic polymer (polyvinyl alcohol), whereby a mixture was prepared.

The resulting mixture was concentrated into a spinning mixture, and the spinning mixture was spun by blowing. Thus, an inorganic fiber precursor was prepared.

A plurality of spun inorganic fiber precursors were stacked together, followed by needling, whereby two sheets were produced.

Each sheet was continuously fired at a maximum temperature of 1250° C. Thus, two fiber sheets each having a length of 600 mm, a width of 200 mm, and a thickness of 5 mm and containing inorganic fibers including alumina and silica at a weight ratio of 72:28 were produced.

The resulting fiber layers each had a bulk density of 0.15 $g/cm^3$ and a basis weight of 1050 $g/m^2$.

(2) Hole Forming Step

Next, a punching machine was used on one of the fiber layers obtained to form through-holes that penetrate through the fiber layer. These through-holes were formed such that each hole had a circular opening having a diameter of 3 mm and these openings were arranged in a zigzag pattern with an interval of 8 mm between each opening.

The fiber layer with through-holes was regarded as a first fiber layer, and the fiber layer without holes was regarded as a second fiber layer.

(3) Inorganic Material Layer Forming Step (3-1) Inorganic Material Preparing Step A powdered inorganic material mainly containing calcium oxide (product name: Instant Cement, fast-drying, 60 minutes; manufacturer: Toyo Matelan Co., Ltd.) was provided.

(3-2) Inorganic Material Adding Step

Next, the inorganic material was applied to a non-opening portion of the first fiber layer.

Then, water was added to the inorganic material to slurry the inorganic material applied to the first fiber layer.

(3-3) Drying Step

Next, the slurry inorganic material applied to the first fiber layer was dried at 70° C. for 10 minutes.

(4) Fiber Layer Producing Step

The back side of the first fiber layer where the inorganic material layer is not formed was pasted to a surface of the second fiber layer, whereby a fiber layer was obtained.

In this manner, the through-hole formed in the first fiber layer became blind holes each having a bottom inside the fiber layer.

A sound-absorbing material according to Example 1 was produced through the above steps.

Example 2

A sound-absorbing material according to Example 2 was produced as in Example 1, except that the inorganic material used in the inorganic material layer forming step (3) was a mixture of the following components: 22 wt % of ceramic fiber (product name: Ibiwool bulk; manufacturer: Ibiden, Co., Ltd.), 45 wt % of silica (product name: CARPLEX #30 DS; manufacturer: DSL. Japan Co., Ltd.), 22 wt % of titania (product name: Rutile Flour S; manufacturer: Kinsei Matec Co., Ltd.), 8 wt % of silica sol (product name: SNOWTEX manufacturer: Nissan Chemical Corporation), 1 wt % of aluminum sulfate: powdered aluminum sulfate (manufacturer: Oji Paper Co., Ltd.), and 2 wt % of cationic polyacrylamide (product name: RD7142; manufacturer: SEIKO PMC Corporation).

Comparative Example 1

Two 10-mm thick fiber layers containing polyethylene resin fibers and a 30-μm thick film-like sound insulation layer containing thermoplastic urethane were provided.

Next, the fiber layers and the sound insulation layer were adhered together to form a stack using a water soluble adhesive (product name: Cemedine Wood Glue; manufacturer: Cemedine Co., Ltd.) in the order of "fiber layer—sound insulation layer—fiber layer", whereby a sound-absorbing material according to Comparative Example 1 was produced.

Comparative Example 2

A 7-mm thick fiber layer was produced by the same method as that described in "(1) Fiber layer producing step" of Example 1. This fiber layer was obtained as a sound-absorbing material according to Comparative Example 2.

Comparative Example 3

Two 7-mm thick fiber layers were produced by the same method as that described in "(1) Fiber layer producing step" of Example 1, and these fiber layers were pasted together, whereby a sound-absorbing material according to Comparative Example 3 was produced.

Comparative Example 4

A 7-mm thick fiber layer was produced by the same method as that described in "(1) Fiber layer producing step" of Example 1. Then, 0.5-mm thick aluminum foil was provided, and circular openings each having a diameter of 3 mm were formed in the aluminum foil. Here, these holes were formed such that their openings were arranged in a zigzag pattern with an interval of 8 mm between each opening.

Then, the fiber layer was pasted to the aluminum foil using a water soluble adhesive (product name: Cemedine Wood Glue; manufacturer: Cemedine Co., Ltd.), whereby a sound-absorbing material according to Comparative Example 4 was produced.

(Measurement of Sound Absorption Coefficient)

The sound absorption coefficient was determined by testing the sound absorption coefficient at normal incidence. Measurement was performed in accordance with JIS A 1405-2:2007 "Acoustics—Determination of sound absorption coefficient and impedance in impedance tubes—Part 2: Transfer-function method".

For the measurement of the sound absorption coefficient, the sound-absorbing materials according to Example 1 and the comparative examples were cut into circles each having a diameter of 29 mm, and placed in an impedance tube of a measurement device (Nittobo Acoustic Engineering Co., Ltd., model: WinZac MTX) for measuring the sound absorption coefficient at normal incidence. Then, the sound absorption coefficient was measured in the frequency range of 500 to 6400 Hz.

Figure 5:
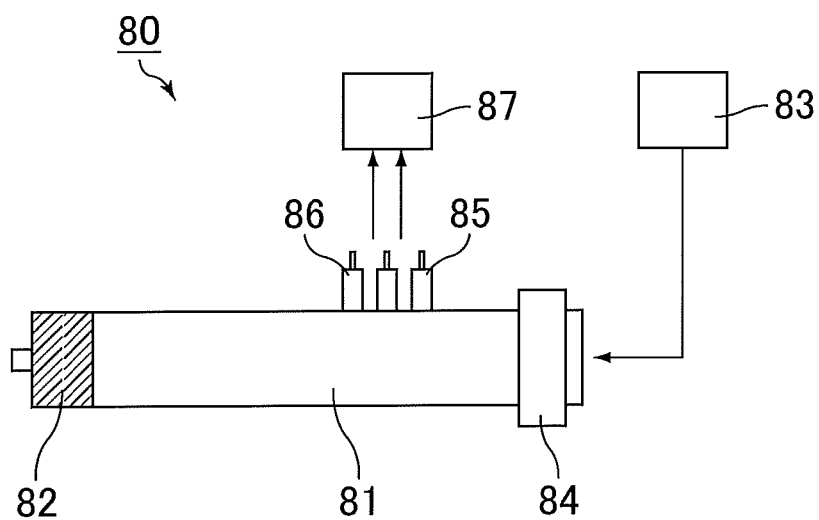
FIG. 5 shows a diagram schematically showing a measurement device for measuring the sound absorption coefficient at normal incidence of a sound-absorbing material.

FIG. 5 is a diagram schematically showing the measurement device for measuring the sound absorption coefficient at normal incidence of a sound-absorbing material.

With this measurement device 80, a sample 82 is placed at an edge of the impedance tube 81, and noise is generated from a speaker 84 by a signal from a noise generator 83, and a sound field is generated inside the acoustic tube 81. Then, sound pressure signals of two ¼-inch microphones 85 and 86 are analyzed by fast Fourier transform (FFT) using an FFT analyzer 87, and the sound absorption coefficient at normal incidence is calculated.

In this measurement, the sound-absorbing material according to Example 1 was placed with its inorganic layer facing the speaker 84, and the sound-absorbing material according to Comparative Example 4 was placed with its aluminum foil facing the speaker 84.

FIG. 6 to FIG. 11 show the results.

Figure 6:
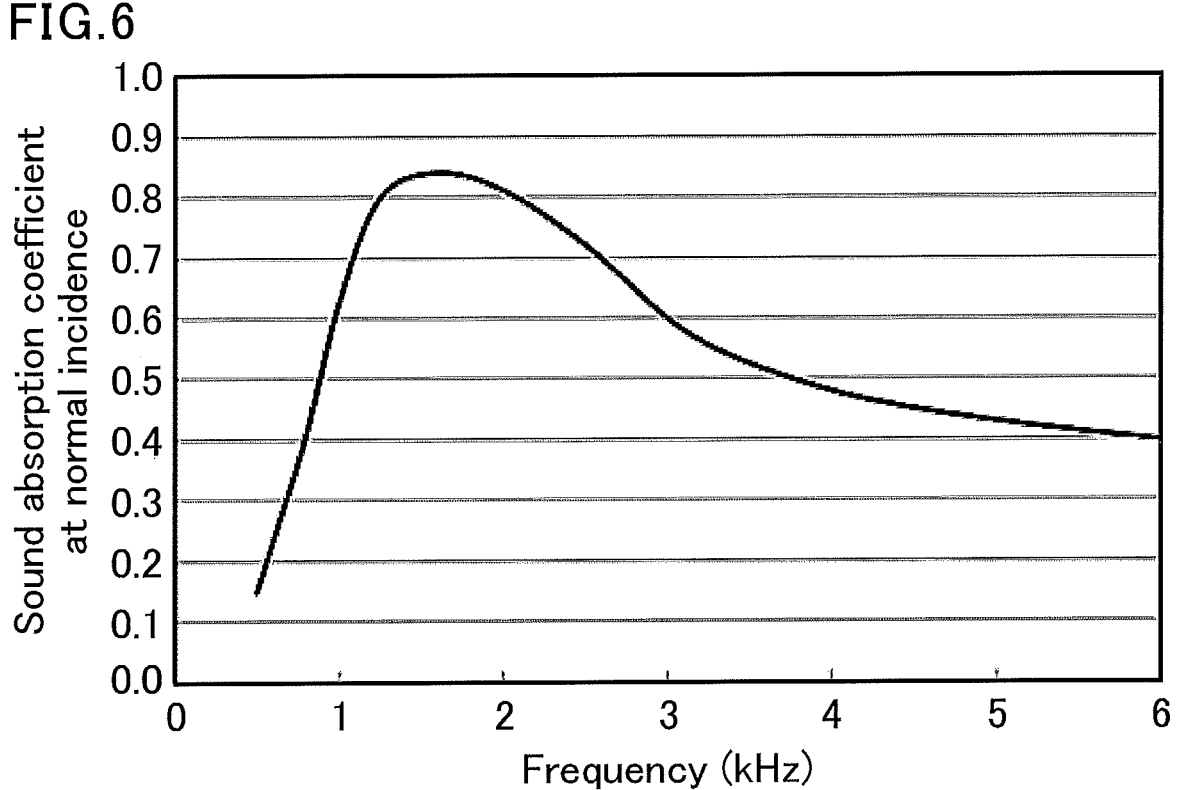
FIG. 6 shows a sound absorption coefficient chart from measurement of sound absorption coefficient using a sound-absorbing material according to Example 1.

FIG. 6 shows a sound absorption coefficient chart from measurement of sound absorption coefficient using the sound-absorbing material according to Example 1.

Figure 7:
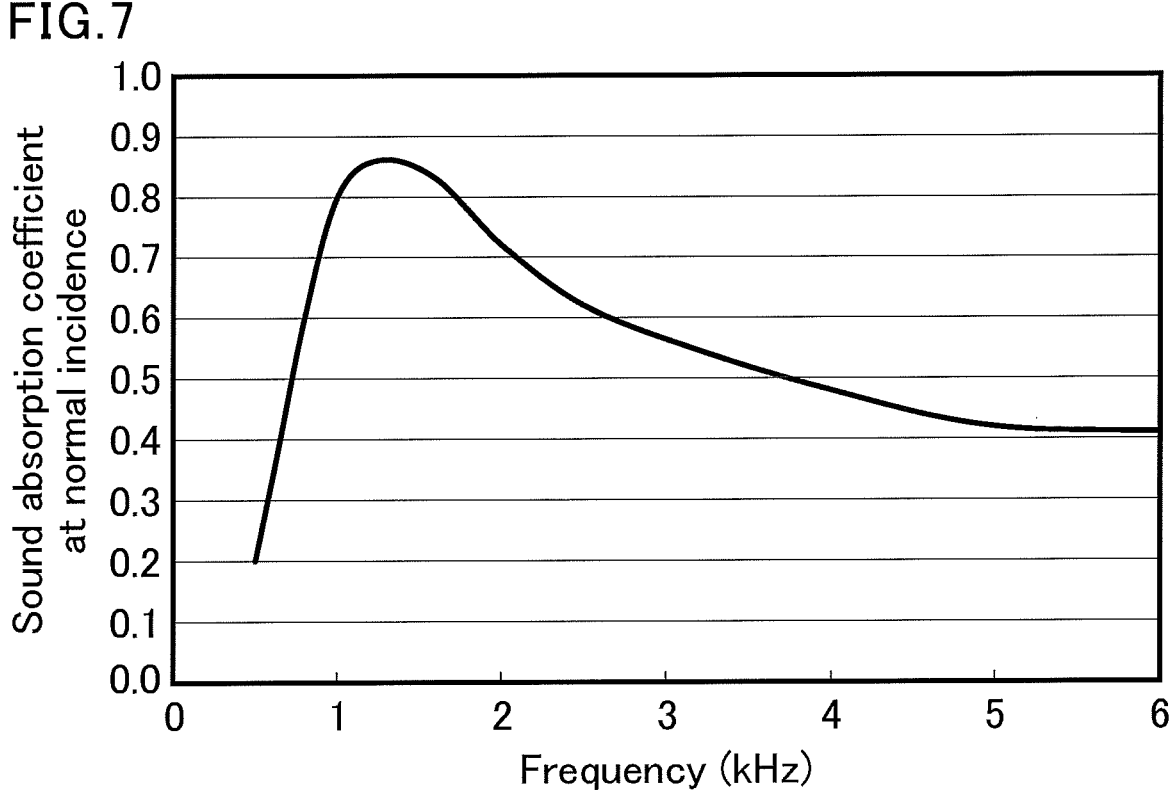
FIG. 7 shows a sound absorption coefficient chart from measurement of sound absorption coefficient using a sound-absorbing material according to Example 2.

FIG. 7 shows a sound absorption coefficient chart from measurement of sound absorption coefficient using the sound-absorbing material according to Example 2.

Figure 8:
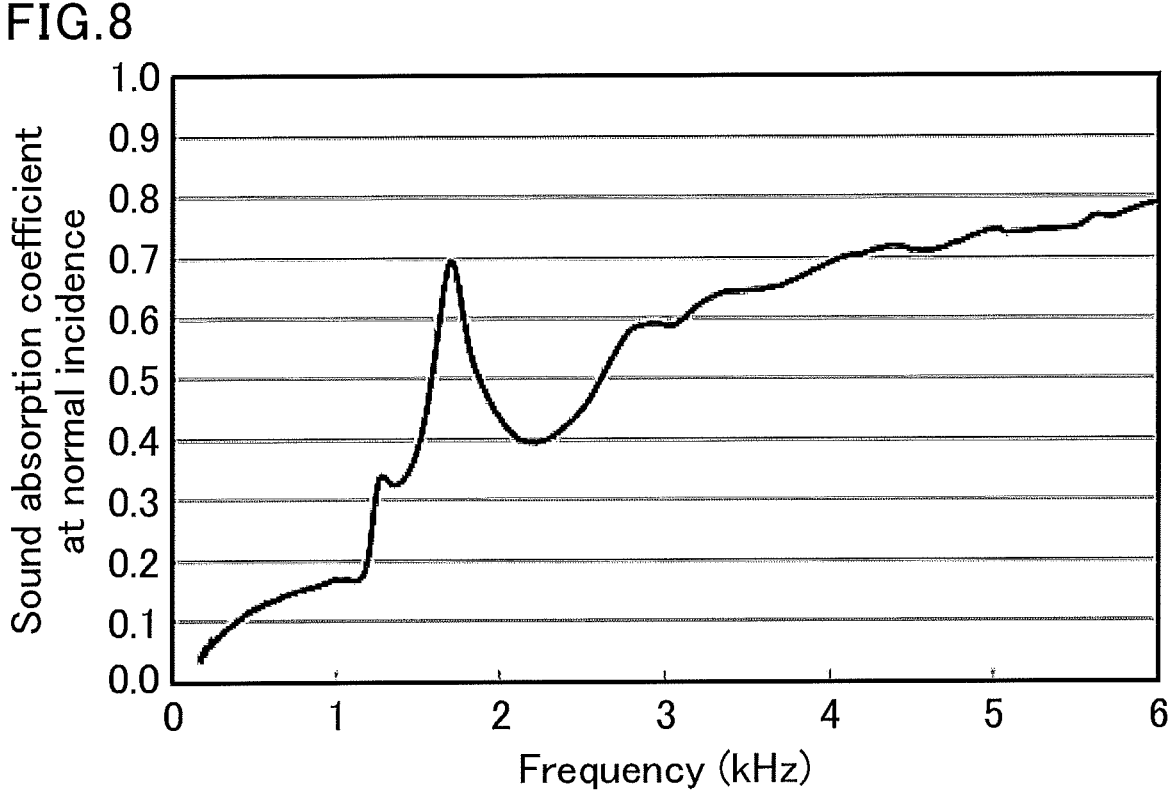
FIG. 8 shows a sound absorption coefficient chart from measurement of sound absorption coefficient using a sound-absorbing material according to Comparative Example 1.

FIG. 8 shows a sound absorption coefficient chart from measurement of sound absorption coefficient using the sound-absorbing material according to Comparative Example 1.

Figure 9:
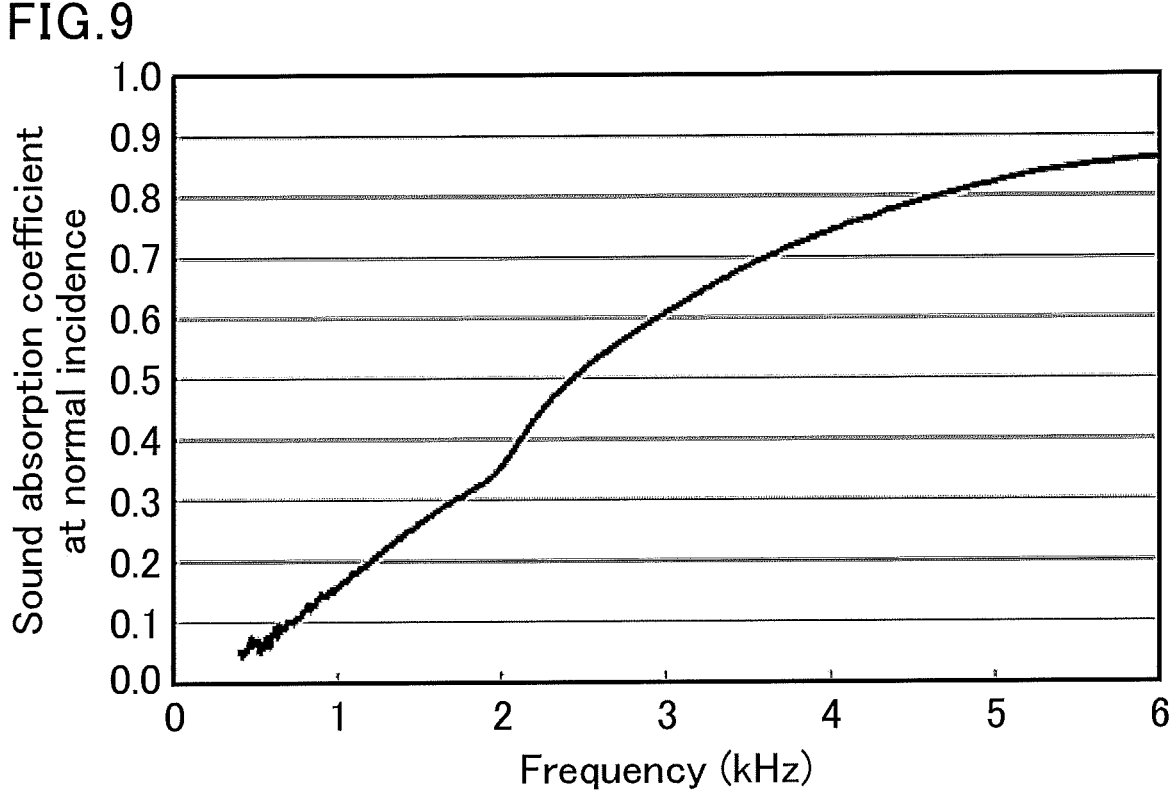
FIG. 9 shows a sound absorption coefficient chart from measurement of sound absorption coefficient using a sound-absorbing material according to Comparative Example 2.

FIG. 9 shows a sound absorption coefficient chart from measurement of sound absorption coefficient using the sound-absorbing material according to Comparative Example 2.

Figure 10:
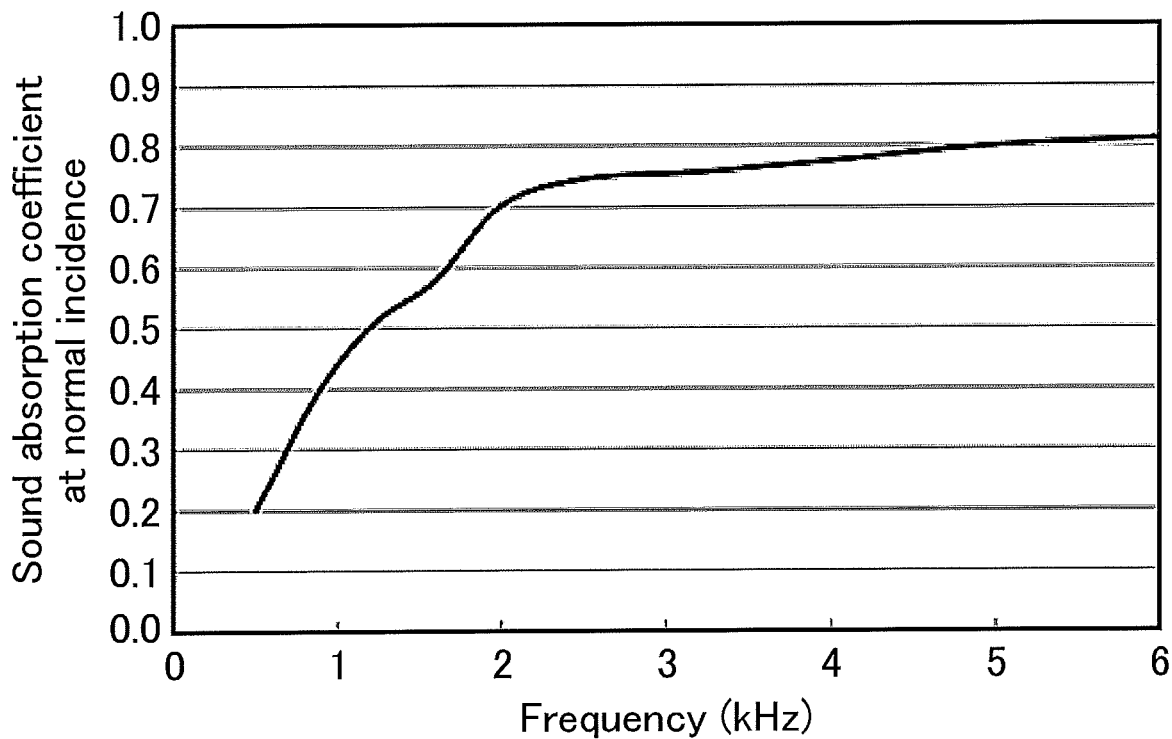
FIG. 10 shows a sound absorption coefficient chart from measurement of sound absorption coefficient using a sound-absorbing material according to Comparative Example 3.

FIG. 10 shows a sound absorption coefficient chart from measurement of sound absorption coefficient using the sound-absorbing material according to Comparative Example 3.

Figure 11:
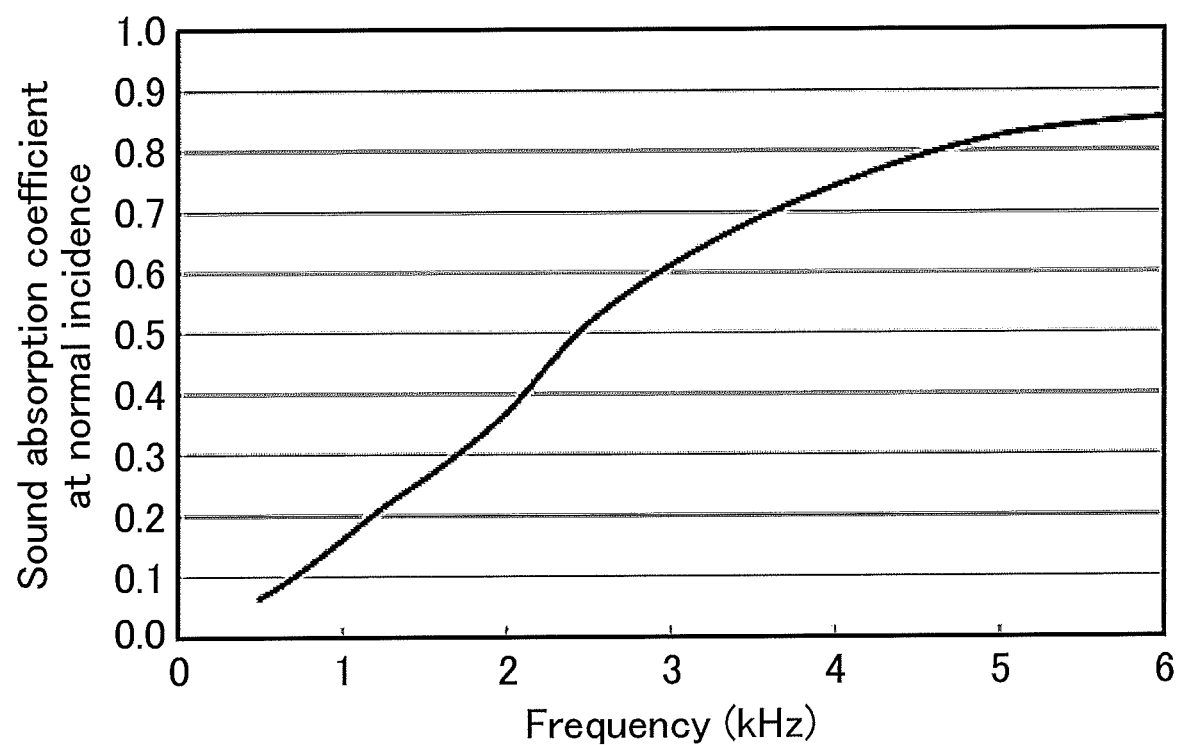
FIG. 11 shows a sound absorption coefficient chart from measurement of sound absorption coefficient using a sound-absorbing material according to Comparative Example 4.

FIG. 11 shows a sound absorption coefficient chart from measurement of sound absorption coefficient using the sound-absorbing material according to Comparative Example 4.

In each of FIGS. 6 to 11, the vertical axis is the absorption coefficient at normal incidence, and the horizontal axis is the frequency.

Using the products of the examples and the comparative examples, the average sound absorption coefficient was calculated by determining the sound absorption coefficient at angular frequency of each ⅓ octave band, i.e., 800, 1000, 1250, and 2000 Hz. Table 1 shows the results.

TABLE 1

|  | Average sound absorption coefficient in 800-2000 Hz |
|---|---|
| Example 1 | 0.698 |
| Example 2 | 0.762 |
| Comparative Example 1 | 0.362 |
| Comparative Example 2 | 0.239 |
| Comparative Example 3 | 0.520 |
| Comparative Example 4 | 0.229 |

As shown in FIGS. 6 to 11 and Table 1, the sound-absorbing materials according to Examples 1 and 2 achieved a higher average sound absorption coefficient in the frequency domain of 800 to 2000 Hz than the sound-absorbing materials according to Comparative Examples 1 to 4 did.

The sound in the frequency domain of 800 to 2000 Hz is unpleasant to the human ear. Thus, the sound-absorbing materials according to the examples are excellent sound-absorbing materials, with higher sound absorption coefficients in this frequency domain.

REFERENCE SIGNS LIST

10, 110, 410 sound-absorbing material
20, 120, 220, 320, 420 fiber layer
121 first fiber layer
122 second fiber layer
30, 130, 230, 330, 430 hole
31, 431 surface of fiber layer
32, 132, 432 bottom
135 through-hole
40, 140, 440 inorganic material layer
80 measurement device
81 impedance tube
82 sample
83 noise generator
84 speaker
85, 86 microphone
87 FFT analyzer

The invention claimed is:

1. A sound-absorbing material comprising:
a fiber layer including a plurality of holes open to a surface thereof and having a thickness of 3 mm or more; and
an inorganic material layer formed on the surface of the fiber layer,
the holes being blind holes each penetrating through the inorganic material layer and having a bottom inside the fiber layer,
wherein a mixture layer of a powdered inorganic material and fibers is present between the inorganic material layer and the fiber layer, and
the inorganic material layer and the fiber layer are bonded to each other by the mixture layer.

2. The sound-absorbing material according to claim 1, wherein the fiber layer has a thickness of 3 to 50 mm.

3. The sound-absorbing material according to claim 2, wherein the holes in the fiber layer have a depth that is 50 to 90% of the thickness of the fiber layer.

4. The sound-absorbing material according to claim 1, wherein the fiber layer includes a stack of two or more fiber layers.

5. The sound-absorbing material according to claim 1, wherein the fiber layer contains inorganic fibers.

6. The sound-absorbing material according to claim 5, wherein the inorganic fibers consist of at least one inorganic fibers selected from the group consisting of alumina fibers, alumina-silica fibers, silica fibers, glass wool, and rock wool.

7. The sound-absorbing material according to claim 1, wherein the area per opening of the hole is 0.10 to 15 mm$^2$.

8. The sound-absorbing material according to claim 1, wherein the inorganic material layer contains at least one inorganic material selected from the group consisting of a calcium-based material, a silica-based material, an alumina-based material, a carbon-based material, and a titanium-based material.

9. The sound-absorbing material according to claim 1, wherein the inorganic material layer has a thickness of 0.1 to 5 mm.

10. The sound-absorbing material according to claim 1, wherein he sound-absorbing material has an average sound absorption coefficient of 0.65 or more in the frequency domain of 800 to 2000 Hz.

11. The sound-absorbing material according to claim 1, wherein the sound-absorbing material is used for any one of an engine, engine room, vehicle body, or an exhaust pipe.

12. The sound-absorbing material according to claim 3, wherein the holes in the fiber layer have a depth that is 50 to 90% of the thickness of the fiber layer.

13. The sound-absorbing material according to claim 2, wherein the fiber layer includes a stack of two or more fiber layers.

14. The sound-absorbing material according to claim 3, wherein the fiber layer includes a stack of two or more fiber layers.

15. The sound-absorbing material according to claim 2, wherein the fiber layer contains inorganic fibers.

16. The sound-absorbing material according to claim 3, wherein the fiber layer contains inorganic fibers.

17. The sound-absorbing material according to claim 4, wherein the fiber layer contains inorganic fibers.

18. The sound-absorbing material according to claim 2, wherein the area per opening of the hole is 0.10 to 15 mm$^2$.

19. The sound-absorbing material according to claim 3, wherein the area per opening of the hole is 0.10 to 15 mm$^2$.

20. The sound-absorbing material according to claim 4, wherein the area per opening of the hole is 0.10 to 15 mm$^2$.

\* \* \* \* \*